C. WAHL.
Vacuum Pan.
No. 54,629.
Patented May 8, 1866.
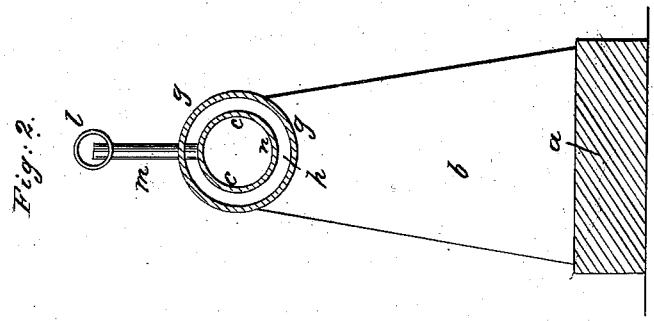
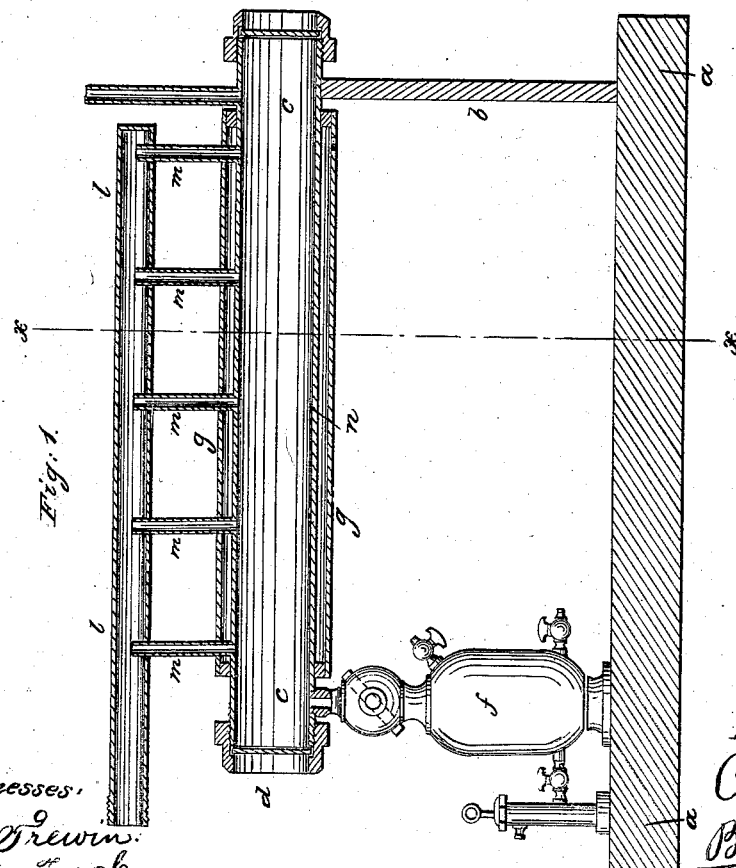

UNITED STATES PATENT OFFICE.

CHRISTIAN WAHL, OF CHICAGO, ILLINOIS.

IMPROVED VACUUM-PAN.

Specification forming part of Letters Patent No. 54,629, dated May 8, 1866.

*To all whom it may concern:*

Be it known that I, CHRISTIAN WAHL, of Chicago, in the county of Cook and State of Illinois, have invented new and useful Improvements in Vacuum-Pans; and I do hereby declare that the following is a full, clear, and exact description thereof, which will enable others skilled in the art to make and use the same, reference being had to the accompanying drawings, forming part of this specification.

With vacuum-pans as heretofore constructed the evaporation of the liquid was uneven, and a continuous operation was not possible— both quite serious disadvantages and inconveniences, a certain quantity of liquid being first drawn into the pan and there kept exposed to the vacuum and a more or less elevated temperature until the whole amount of the liquid had been sufficiently reduced to draw it off. This mode of operation had the effect of coloring the liquid more or less, and besides, other injurious effects were produced by the total or partial absence of air.

To obviate these results is the principal object of the present invention; and it relates to a novel construction of a vacuum apparatus, whereby all the above difficulties are remedied and the pan can be continuously used, the liquid flowing into and passing through it, during which it is subjected to the action of the requisite heat and exposed to the vacuum.

This apparatus consists of a horizontal receptacle or other receiver, closed at both ends, made of copper or any other suitable metal or material, surrounded by a jacket of wood or metal filled with steam, the receiver being connected by a series of small vertical pipes, with a horizontal pipe placed above or over the same in such a manner that the water condensed from the vapors arising from the evaporation of the liquid within the receiver cannot possibly flow back into the same, as will be presently more fully explained.

This pipe is connected with the condenser and air-pump as heretofore, an overrunner being placed between the two, if desired, and at one end of the receiver, which constitutes the vacuum-pan and also the heating surface of the same, the liquid to be evaporated is fed, its flow being regulated at pleasure by any suitable means, and passing over the interior and lower surface of the receiver, is subjected to the action of the heat, escaping therefrom at the opposite end, through any suitable device connected therewith which will allow it, while at the same time no air can possibly enter the vacuum-pan, the liquid while passing over and through the receiver being evaporated, the extent of which can be increased or decreased by feeding a smaller or larger quantity of liquid thereto.

In accompanying plate of drawings my improvement is illustrated, Figure 1 being a central longitudinal vertical section taken through the vacuum-pan and its connecting parallel pipe, showing a device for removing the condensed liquid from the pan; Fig. 2, a transverse vertical section taken in the plane of the line $x\,x$, Fig. 1.

$a\,a$ in the drawings represent the supporting frame-work of the apparatus, on the upright standard $b$ of which one end of a cylindrical-shaped receiver or receptacle, $c$, placed in a horizontal position, but slightly inclined toward its other end, $d$, is secured, the other end, $d$, being supported by a vertical air-tight receiver, $f$, communicating at its upper end with the said horizontal receiver $c$, the purpose of which will be hereinafter more particularly explained. This cylindrical receiver $c$ can be made of copper or any other suitable metal or material, closed at both of its ends, and is surrounded by a jacket or casing, $g$, either metal or wooden, leaving a small space or chamber, $h$, entirely around it, into which steam is admitted and allowed to circulate for imparting the requisite degree of heat to the said receiver, which constitutes the vacuum-pan.

$l$, a pipe or tube placed in a horizontal plane, or nearly so, above and over the receiver $c$, a short distance from it, between which pipe and the receiver communication is had through a series of vertical pipes, $m\,m\,m\,m$, placed at short distance apart and extending up and into the said pipe $l$ a short distance above its lower surface, this pipe being connected in any suitable manner at one end with a proper receptacle for receiving the condensed products passing through it, as will be presently described.

In the operation of my improved vacuum-pan the liquid to be evaporated is fed into the receiver at its higher end in suitable quantities and amounts, and passing through the same upon and over its lower surface, $n$, is subjected to the action of the heat produced by the steam within its surrounding casing or jacket, escapes at its lower end through and into the vertical chambered receiver $f$, from which it is withdrawn in any proper manner. The liquid, while thus passing through the receiver, and by being subjected to the action of heat, as described, is evaporated, the vapors arising therefrom escaping up and through the vertical pipes $m\ m$, entering the tube, where, becoming condensed, they are properly drawn off when desired, the projecting of the pipes within the said tube, as explained and represented in the drawings, partially preventing any possibility of their flowing back and into the receptacle and vacuum-pan below, the advantages of which are manifest.

The strength of the current of liquid through the receiver can, it is evident, be regulated at pleasure, and in proportion as it is great or small the evaporation of the liquid will be accordingly varied; and, furthermore, by feeding greater or lesser quantities of liquids to the receiver its evaporation will be correspondingly varied, and thus it will be readily observed that the liquid can be condensed to any degree of consistency desired, the importance of which is obvious.

The liquid remaining in the receiver as it is evaporated, or rather passing therefrom into the receiver $f$, can be removed therefrom in various ways, some of which may be here mentioned, as by the use of a pump, or by making the receiver air-tight, which from time to time may be emptied, first, however, disconnecting it from the vacuum apparatus, &c.

Each end of the vacuum-cylinder may be made of glass or other suitable transparent material, or only a portion of the same, so that the operation of the pan can be observed at pleasure; and also, in lieu of only encasing the vacuum-pan with a steam-jacket, as described, the tube or condenser may be also surrounded with one, either in connection therewith or separate therefrom, if desired, to obviate any uneven expansion or contraction of the parts; and a series of pipes and receivers may be arranged together, if desired.

It is hardly necessary for me to observe in conclusion, but to avoid any possibility of a misunderstanding arising, I deem it expedient that in the receiver and connecting parts of my apparatus a vacuum is produced and maintained during its operation, the ordinary devices being used to accomplish it.

From the above description it is obvious that with my improved apparatus an even and uniform evaporation of a liquid is secured, and to any desired degree of consistency, and a continuous operation of the same obtained, both of which results are of the utmost importance, as is well known to all conversant with the evaporation of liquids; and, furthermore, in lieu of a large amount of liquid being subjected at one and the same time to the action of the heat and the vacuum, as heretofore, which prevented the bubbles of steam or vapor generated in it where it was in contact with the heated surface from rising or escaping, (this difficulty increasing in direct proportion as the density of the liquid increased, whereby oftentimes the whole of the liquid, or at least a great portion of the same, was lifted or thrown out of the pan, and thus wasted in the pumps used,) only a small portion or layer of liquid is subjected to the action of the vacuum-pan at one and the same time, and even this is continually kept in circulation and motion through it, the advantages of which are obvious.

I claim as new and desire to secure by Letters Patent—

1. Evaporating liquids by passing them in a continuous current through an air-tight receiver or vacuum-pan placed in a horizontal position, or nearly so, to which pan the requisite degree of heat is imparted by steam or any other suitable medium, substantially as and operating in the manner described.

2. Connecting the vacuum-pan with the condenser, for the vapors arising from the evaporation of the liquid within the pan, by and through a series of pipes or their equivalent, communicating with the said condenser, substantially in the manner described and for the purpose specified.

The above specification of my invention signed by me this 17th day of August, 1865.

CHRISTIAN WAHL.

Witnesses:
ALBERT W. BROWN,
C. L. TOPLIFF.